(12) United States Patent
VanDenBerghe et al.

(10) Patent No.: US 8,361,615 B2
(45) Date of Patent: *Jan. 29, 2013

(54) TAPE WITH A LONGITUDINALLY EXTENDING FILAMENT

(76) Inventors: Garry Cyrille Alfred VanDenBerghe, Coldstream (CA); Robert Amborsky, Winnipeg (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/473,152

(22) Filed: May 16, 2012

(65) Prior Publication Data

US 2012/0251792 A1    Oct. 4, 2012

Related U.S. Application Data

(62) Division of application No. 13/327,042, filed on Dec. 15, 2011, which is a division of application No. 12/580,838, filed on Oct. 16, 2009, now Pat. No. 8,187,407.

(60) Provisional application No. 61/226,947, filed on Jul. 20, 2009.

(51) Int. Cl.
*B32B 7/12* (2006.01)
*B32B 15/04* (2006.01)
*B29C 65/00* (2006.01)

(52) U.S. Cl. ............... 428/343; 428/354; 156/248
(58) Field of Classification Search ............ 428/343, 428/354; 156/248
See application file for complete search history.

(56) References Cited

U.S. PATENT DOCUMENTS

| | | | |
|---|---|---|---|
| 2,005,665 A | 6/1935 | Saignier | |
| 3,810,813 A | 5/1974 | Ellis | |
| 4,255,469 A | 3/1981 | McGinness | |
| 5,054,618 A | 10/1991 | Kim | |
| 6,025,045 A | 2/2000 | Langeman | |
| 6,235,365 B1 | 5/2001 | Schaughency et al. | |
| 6,875,469 B2 | 4/2005 | Langeman | |
| 7,014,900 B2 | 3/2006 | Langeman | |
| 7,314,312 B2 | 1/2008 | Soderholm | |
| 7,550,187 B2* | 6/2009 | Seth et al. | 428/41.8 |
| 7,914,638 B2 | 3/2011 | Van Den Berghe | |
| 8,187,407 B2 | 5/2012 | Van Den Berghe | |
| 2006/0266464 A1 | 11/2006 | White | |
| 2007/0284046 A1 | 12/2007 | Habisreitinger et al. | |
| 2008/0092483 A1 | 4/2008 | Osgood | |
| 2009/0074994 A1 | 3/2009 | McLean | |

FOREIGN PATENT DOCUMENTS

CA    2686003    10/2012

OTHER PUBLICATIONS

Langeman Mfg Ltd., Wire Trim Detail Information, http://replay.web.archive.org/20000200005l1224127//http://www.langeman.com.

* cited by examiner

*Primary Examiner* — Victor Chang
(74) *Attorney, Agent, or Firm* — Adrian D. Battison; Ade & Company Inc

(57) ABSTRACT

A vehicle is wrapped by a printed adhesive film where the film is also applied over doors and other areas intended not to be covered. The film is cut at the door edge and over the area by adhesively attaching a tape having a release coating on the front surface and carrying a filament along a center of the front side. The printed film is applied over the door, the area not to be covered and the tapes and is cut along the door edge and around the area by pulling the filament from the tape so that a strip of the film at the door edge and the film over the area can be removed. The film can be stretched and pulled away from the tape for reapplying for proper fit.

17 Claims, 6 Drawing Sheets

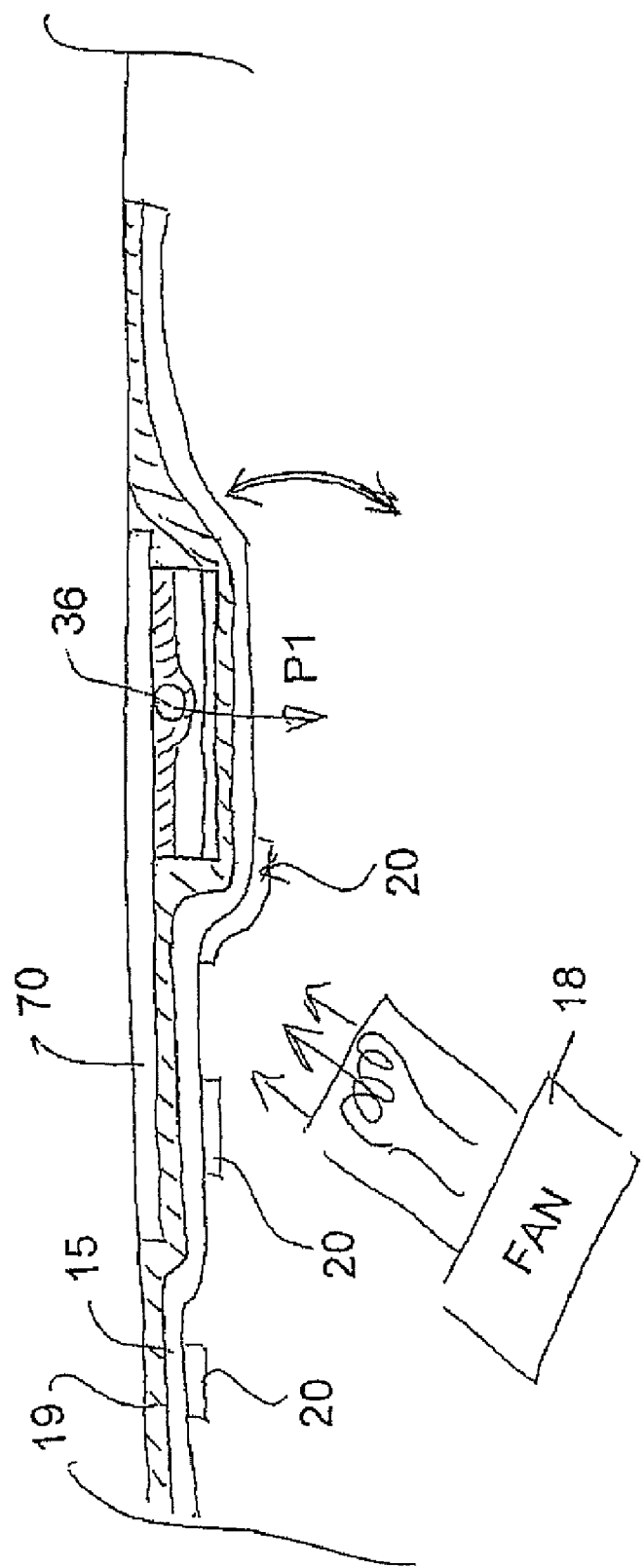

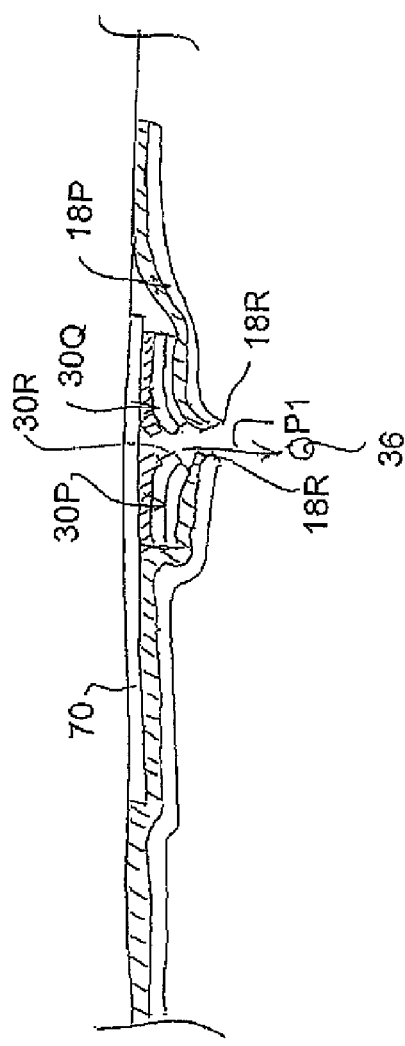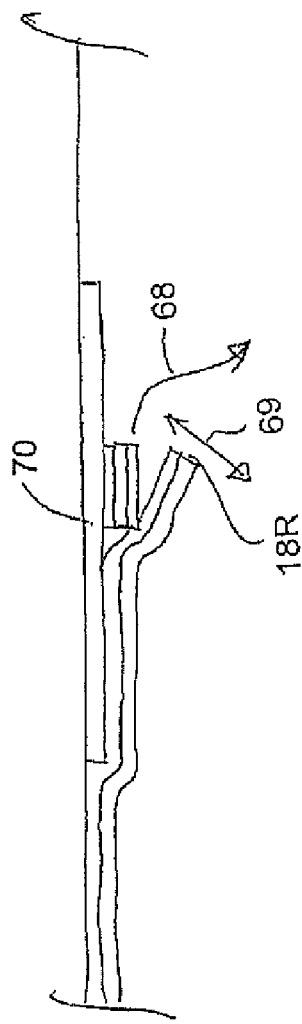

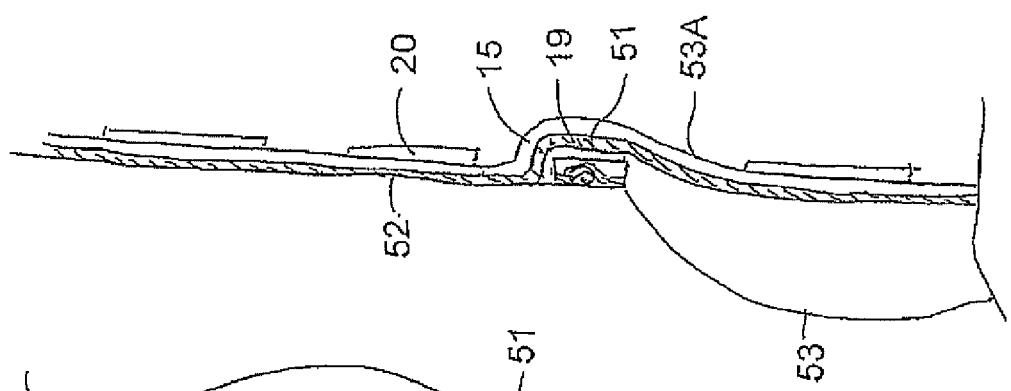
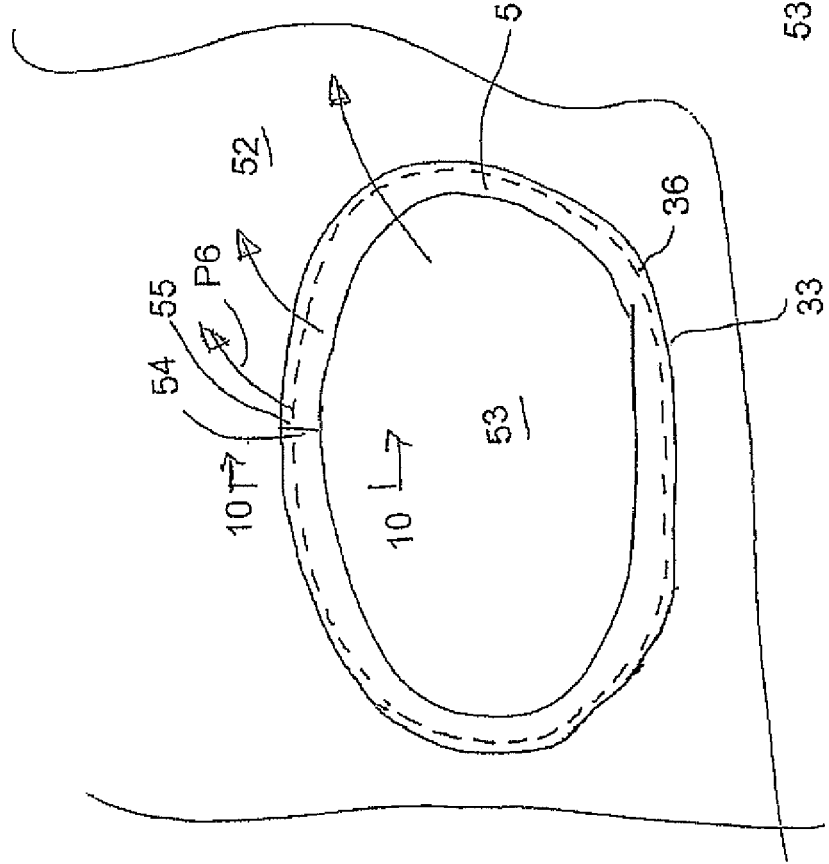

TAPE WITH A LONGITUDINALLY EXTENDING FILAMENT

This application claims the benefit under 35 U.S.C. 119 of Provisional application 61/226,947 filed Jul. 20, 2009.

This application is a divisional application of application Ser. No. 13/327,042 filed Dec. 15, 2011 which is a divisional application of application Ser. No. 12/580,838 filed Oct. 16, 2009 now issued as U.S. Pat. No. 8,187,407. This application is also related to U.S. Pat. No. 7,914,638 issued Mar. 29, 2011.

This invention relates to a tape with a longitudinally extending filament.

BACKGROUND OF THE INVENTION

The tape described herein is particularly but not exclusively designed for cutting film.

Popular customization of vehicles in some cases involves the application of an adhesive film carrying printed graphics to the exterior surface of the vehicle. Such a film is readily available for example from 3M and is provided in large sheets carrying a pressure sensitive adhesive covered by a release layer allowing the sheet to be printed with the required graphics and applied to the vehicle.

One issue which remains a difficulty is that of cutting the film at required locations so that the film terminates at the edge of a panel or at any other required location on the vehicle.

U.S. Pat. No. 7,014,900 issued Mar. 21, 2006 and other related patents of Langeman provide an arrangement for cutting a polymer coating which is applied to a surface and cured. The arrangement provides a tape with a filament enveloped in a wrapped portion of the tape where the filament is pulled through the coating to effect a cutting action. However this is not suitable for film of the above type for a number of reasons and has never been used with film.

U.S. Pat. No. 4,255,469 (Mcginness) issued Mar. 10, 1981 to Hughes Aircraft provides a tape with an attached filament which is used to mask and cut a moisture proof coating applied to circuit boards where certain parts of the board must be masked to remain clear of the coating. The tape is PTFE (Teflon) or PET (Mylar) and the filament is nylon. This tape is used in very small straight pieces to cover edges of circuit boards and is not suitable for cutting film of the above type for a number of reasons.

U.S. Pat. No. 2,005,665 (Saignier) issued Jun. 18, 1935 provides a paper tape with an enclosed filament which is attached to boxes and used as a tear strip for tearing open a tear line on the box. Again this tape is used in very small straight pieces and is not suitable for cutting film of the above type for a number of reasons.

SUMMARY OF THE INVENTION

It is one object of the invention to provide a tape having a longitudinally extending filament.

According to the invention there is provided a tape comprising:

a tape body having a front surface, a rear surface, a first longitudinal side edge and a second longitudinal side edge;

the tape body having an adhesive on the rear surface for attachment to an object;

the front surface of the tape being free from adhesive and having a release characteristic relative to pressure sensitive adhesive such that the pressure sensitive adhesive can be contacted onto the front surface of the tape and pulled away;

the tape body having a longitudinally extending filament attached thereto;

wherein the filament is attached to the tape body at a position thereon spaced from both side edges of the tape to a distance which allows bending of the tape in a first side to side direction by extension of the tape along the second longitudinal side edge and in a second side to side direction by extension of the tape along the first longitudinal side edge.

Preferably the filament and the tape body are arranged such that, with the rear surface attached to the object, the filament when pulled tears through either the entire thickness of the tape body or through a part only of the thickness along the length of the tape body, rather than pulling out from one side edge of the tape body.

Typically the adhesive has the characteristic that the tape body can be pulled from a surface of the object without leaving an adhesive residue and without damaging the surface.

Preferably the tape body carries a single filament.

Preferably the filament is carried in or on the adhesive on the rear surface. In this case, the adhesive is arranged to hold the filament in place on the tape during bending of the tape while the tape is applied to the surface and while the filament is being pulled to effect the cutting of the film. In this case, the filament when carried on the adhesive has a coating material compatible with the adhesive for generating an improved adhesion between the filament and the adhesive.

In an alternative arrangement, the adhesive is applied onto the substrate over the filament to hold the filament against the surface of the substrate.

As the filament is spaced from the first and second side edges and the tape has a width arranged such that the filament tears through the tape along the length of the tape, when pulled to cut the film, rather than pulling from one side edge of the tape, the tearing of the tape leaves a portion of the tape along the first side edge underneath the edge of the film which is removed after the film is cut and the edge laid flat on the surface. In this case, preferably the tape is colored to visually distinguish the portion of the tape from the film.

In some cases a primer is applied to the surface at least underneath the tape for increased attachment of the edge of the film to the surface and the adhesive of the tape preferably has the characteristic that the tape can be pulled from the primer on the surface of the object without leaving a residue of the adhesive and without damaging the primer surface.

Preferably the tape is formed of a plastics material allowing stretch of the tape greater than that of the filament. Preferably the tape is formed of a PVC. Preferably the pressure sensitive adhesive on the tape is rubber based as this can provide the required properties of adhesion and subsequent removal of the tape.

Preferably the tape carries a release coating on the front surface having a release characteristic relative to the pressure sensitive adhesive on the film such that the pressure sensitive adhesive on the film can be contacted onto the front surface of the tape and pulled away for repositioning without dislodging the tape from the object.

In accordance with another feature the tape may comprise a laminate of a first substrate carrying the adhesive on a rear surface thereof and a second substrate carrying a release coating on a front surface thereof with the filament located between the first and second substrates.

The tape can be used in a method which can include printing onto a second opposed surface of the film a pattern to be wrapped onto the object so as to apply the pattern around a part of the object and over the panel.

The tape can be used in a method which can be used to apply various types of film such as vinyl to vehicles. This can include large sheets or panels which are used to wrap or can include stripe packages that also require cutting. Some vehicles have reflective vinyl striping down both sides, so the stripe must be cut around the wheel wells, door handles and the like. Pinstripes on cars, trucks etc, also require cutting and again this application would alleviate the use of a knife. All applications can be done using various types of vinyl, perhaps printed or unprinted.

The tape may include a substrate with the adhesive applied to one surface of the substrate, or the tape may comprise simply an adhesive material with the filament attached thereto or embedded therein.

The filament can be formed of any suitable material which has sufficient strength to carry out the cutting action when pulled without breaking and a sufficient cutting action to effect cutting and not tearing the film. Metal wire is typically suitable. Other materials such as carbon fiber or Kevlar fiber can be used. MOPP (mono-axially oriented polypropylene) is preferred.

Preferably the tape has a width less than 0.25 inches so that the bare piece or strip at the edge of the panel and at the edge of the adjacent portion is as narrow as possible.

The absence of adhesive on the front surface of the tape can be used to allow the film position to be adjusted on the panel and on the object so that it is properly placed and located without creases or folds or bubbles while aligning printed images from different sheets as required. Thus the pressure sensitive adhesive on the film itself is used to attach the film to all locations and the release coating is of a character that the film can be pulled back and re-located when required without dislodging the tape from the object.

Films of this type are available with a release layer from suppliers such as 3M and can be printed with the pattern at the place of application using designs supplied by a customer.

The object is typically a vehicle or boat or other transportation device including automobiles, vans, buses and the like. In this case the panel is typically a door or trunk lid.

The area to be left uncovered can be any area of a surface of the object such as a door handle, gas filler cap or the like. In this case the whole surface of the vehicle or other object is to be covered but includes such areas which cannot be covered without interfering with the operation.

However other objects can be covered where the problem of doors or other panels and the problem of areas to be left uncovered is to be resolved using the above invention. The film typically wraps around at least a side of the vehicle where the hinged panel is a door and around a rear of the vehicle where a second hinged panel is provided and covered using the invention.

BRIEF DESCRIPTION OF THE DRAWINGS

One embodiment of the invention will now be described in conjunction with the accompanying drawings in which:

FIG. 5 is a cross sectional view through a surface of an object showing the tape and film applied during a first step in the method.

FIG. 6 is a cross sectional view through the surface and the tape and film with the filament of the tape pulled to effect cutting of the film.

FIG. 7 is a cross sectional view through the surface and the film with the film cut and the last portion of tape being removed.

FIG. 9 is a front elevational view of a surface of the vehicle showing an area not to be covered by the film.

FIG. 10 is a cross sectional view along the lines 10-10 of FIG. 9.

In the drawings like characters of reference indicate corresponding parts in the different figures.

DETAILED DESCRIPTION

Figure 11:
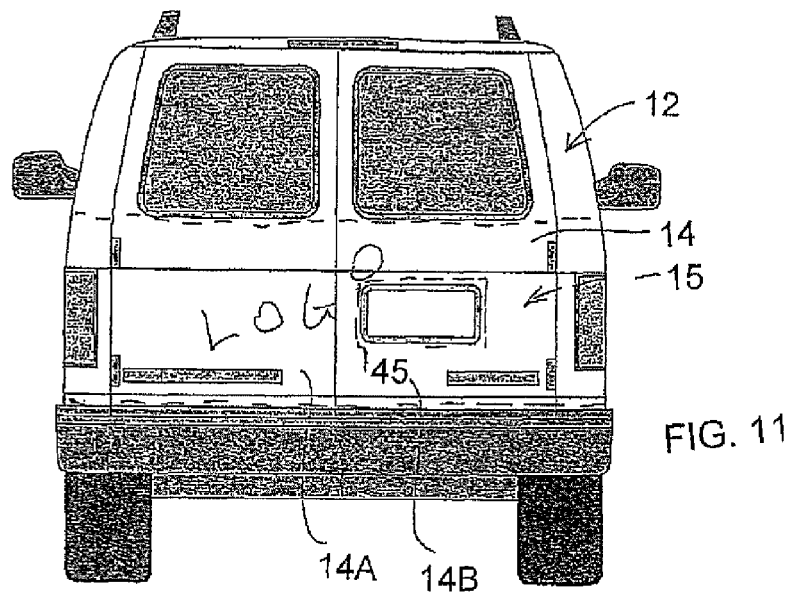
FIGS. 11, 12 and 13 show various views of a vehicle to be wrapped with a printed film showing door and other panels to be opened and showing areas not to be covered by the film.

In FIG. 11 is shown a vehicle 10 such as a panel van, including a side panel 11 including a door 13 and a rear panel 12 including hinged panel 14 in the form of a pair of rear doors 14A and 14B.

It is intended that a film 15 should be wrapped around the vehicles to cover the sides 11 and the rear 12. The film can be supplied as a single sheet but typically will be formed in smaller sheets which are butted edge to edge or slightly overlapping to cover as much of the vehicle as is required. Each sheet or the whole sheet is printed with a custom selected pattern to be applied to the vehicle, such as a company logo or the like as required by the vehicle user.

The vehicle includes a number of hinged panels such as doors, trunk lid and hood which can move from a closed position in which an edge 16 of the panel abuts an adjacent edge portion 17 of the vehicle.

The film 15 typically of vinyl is printed with pattern 20 on the front surface and carries an adhesive 19 on the rear surface. The pattern is arranged to be wrapped onto the vehicle so as to apply the pattern around a part of the vehicle and over the panel.

Such a film is available from 3M and is widely used for this purpose. It is supplied with a release layer (not shown) which can be peeled away to expose the pressure sensitive adhesive for attachment to the vehicle.

Typically as the sheet is supplied in flat form and the vehicle surface is extensively contoured, it is necessary to pull and stretch the film to fit the surface. This typically includes, in extreme locations, the application of heat from a heat gun to the sheet 18 and generally includes the repeated steps of pulling the sheet, applying it temporarily over the surface, removing the sheet for further pulling and reapplying the sheet until it is applied in a contour fit condition against the vehicle with no bubbles.

In order to effect cutting of the film at the edges 16 and 17 there is provided a tape 30 shown in FIGS. 1 to 4 having a front surface 31, a rear surface 32, a first longitudinal side edge 33 and a second longitudinal side edge 34. The tape has an adhesive layer 35 on the rear surface 32 for attachment to the vehicle. The tape 30 is free from adhesive on the front surface 31 which instead has a release characteristic allowing it to release from or to repel adhesive such as the adhesive 19 on the sheet 15. This release characteristic is typically provided by an actual coating 31A but can be provided by the characteristics of the substrate itself or by a co-extruded layer on the substrate. The release coating is not intended to be removed and is not therefore a removable peel away sheet. The tape 30 carries a filament 36.

The filament can be located along one longitudinal side edge 33 or 34 but preferably is located along a line part way or mid way across the tape spaced from both the first and second longitudinal side edges 33, 34.

Figure 1:
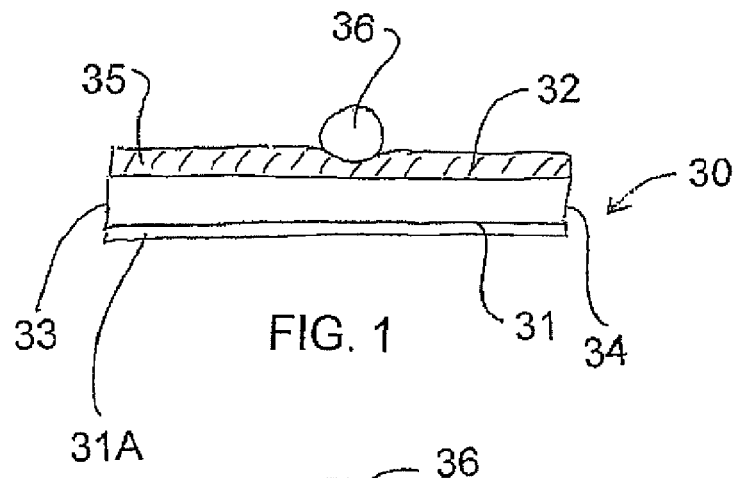
FIGS. 1 to 4 show cross sectional views through four embodiments of tape for use in the present invention.

In FIG. 1, the filament is simply applied onto the adhesive layer 35 and is attached thereto. Thus the filament can be simply attached to a pre-exiting tape. Typically the thickness of the tape base or substrate and the adhesive is of the order of 0.002 to 0.005 inches and the diameter of the filament is of the order of 0.0025 to 0.010 inches so that the filament stands up from the adhesive and is not buried or implanted in the adhesive material. However the selection of the adhesive and the filament is such that it remains attached during the step of the method up to the pulling of the tape to cut the film.

Figure 2:
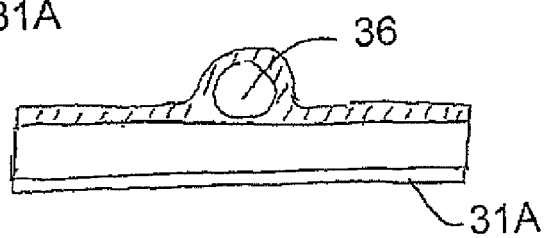

In FIG. 2, the adhesive is applied after the filament is laid on the tape substrate and thus covers over the filament providing an enhanced attachment where required.

Figure 3:
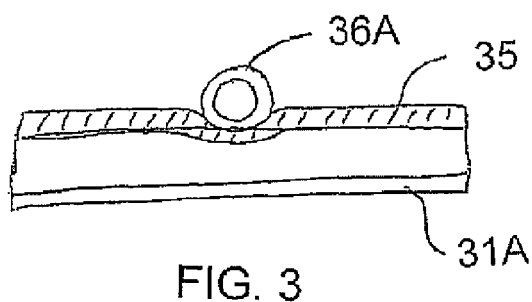

In FIG. 3, the filament carries a pre-applied adhesive or primer material 36A which co-operates with the adhesive 35 providing an enhanced attachment where required.

Figure 4:
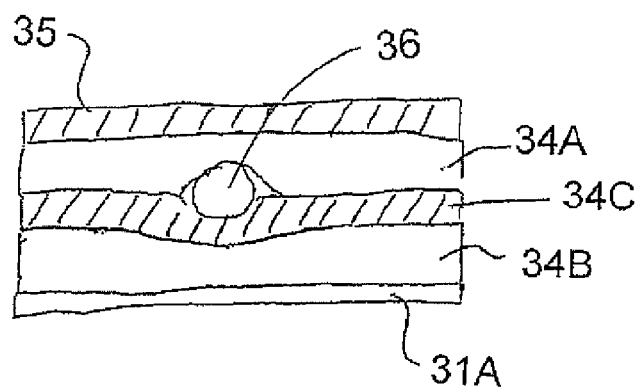

In FIG. 4 and alternative construction is provided which includes two substrate layers 34A and 34B laminated together by a laminating adhesive 34C with the filament 36 captured between the layers 34A and 34B and thus held in place. The layer 34A carries on its rear surface the adhesive 35 and the layer 34B carries on its front surface the release coat 31A. The laminating adhesive 34C has to be such that it allows the filament to release from it. The filament could be treated to prevent becoming fixed to the adhesive if say the laminating adhesive was the cross linkable type. This is not an issue if pressure sensitive adhesive is used for the laminating adhesive.

The tape has a width in the range 0.060 to 0.500 inches and is preferably less than 0.25 inches.

The tape is extensible to a degree so as to allow bending to at least one side by extension along the opposite side. Thus the tape can bend to each side through any angle to take up a minimum inside radius of curvature of the order of 0.157 inches. This allows it to be bent or wrapped around elements on the vehicle such as door handles and other items previously described while the tape remains flat against the vehicle surface and attached to the vehicle surface by its layer of adhesive.

As shown the filament is spaced from both side edges to allow bending in both directions. As the filament is located in the middle as shown, the tape is symmetrical and will bend equally in each direction. However the filament can be offset to one side or can be at one edge. In this case the tape can be arranged so that it is applied easily with curvature only in one direction with the filament always on the inside of the curve. With this same configuration, a reverse curve, with the filament on the outside of the curve, can be done by making partial cuts at spaced positions at right angles to its length along the inside edge to allow the edge to be compressed to form the inside curve. Typically the filament is less extendible than the tape since longitudinal extension of the filament in the longitudinal direction is undesirable during the pulling action.

The adhesive thus acts to hold the filament in place on the tape during bending of the tape while the tape is applied to the surface and while the filament is being pulled to effect the cutting of the film.

The tape is formed of a plastics or filmic material allowing stretch of the tape greater than that of the filament and preferably the tape is formed of a PVC which has been found to provide the best characteristics of strength, co-operation with film adhesive, elongation and clean cutting of the film.

The filament is preferably formed of Dyneema® which is a synthetic fiber based on ultra high molecular weight polyethylene and has been found to provide the best characteristics of strength, resistance to elongation and flexibility. However other plastics materials such as monoaxially oriented polypropylene or natural fibers can be used including metal wire.

Figure 8:
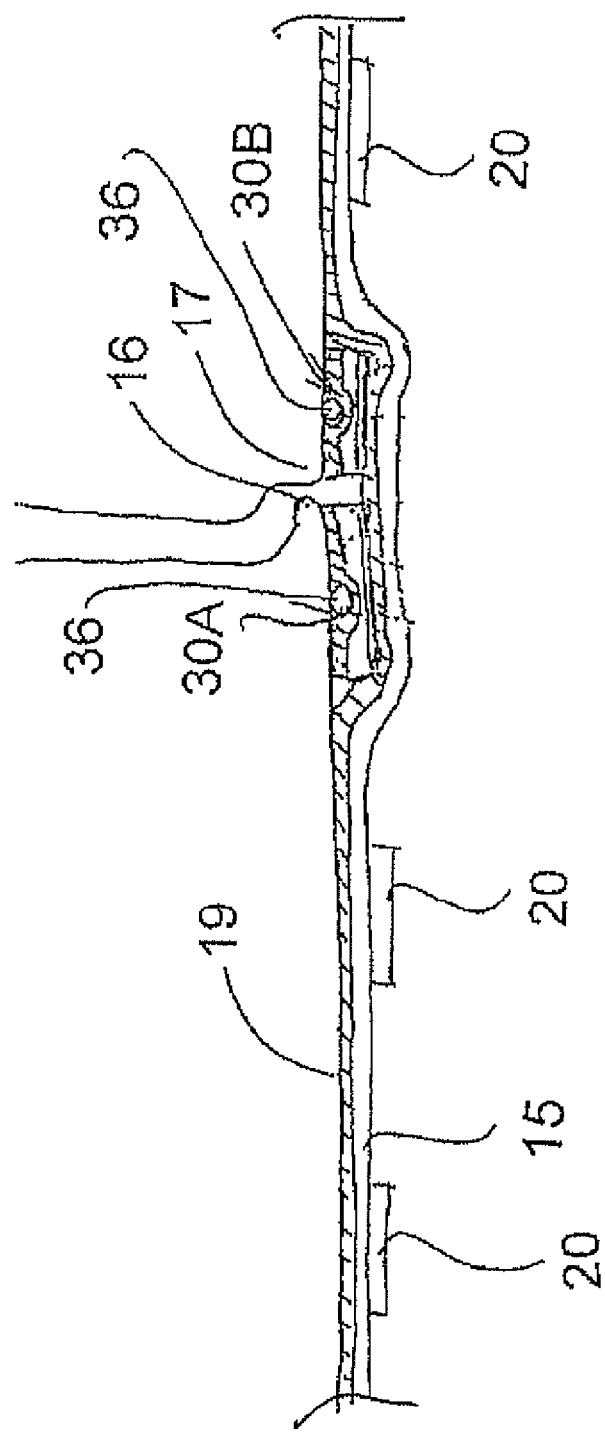
FIG. 8 is a cross sectional view through the object at a junction between a panel such as a door of the vehicle and the adjacent surface of the vehicle showing the tape and film applied for the method.

In use as shown in FIG. 8, a first length 30A of the tape is applied and adhesively attached to the panel such that the second longitudinal side edge 34 is applied substantially along the edge 16 of the panel and the first longitudinal side edge 33 is spaced from the edge 16 of the panel. The filament 36 located midway between the edges is also therefore located at a position spaced from the edge 16 of the panel.

A second length 30B of the tape is applied and adhesively attached to the panel at the edge 17 such that the second longitudinal side edge 34 is applied substantially along the edge 17 of the panel and the first longitudinal side edge 33 is spaced from the edge 17 of the panel. Again the filament 36 is located spaced from the edge 36.

The film 15 is attached by the adhesive 19 over the panel and the vehicle at the edge of the panel so as to wrap the vehicle and apply the pattern 20 to the vehicle with the film being attached to the vehicle by the adhesive 19.

The cutting of the film cannot be carried out in advance of the application since the film stretches and moves as it is applied in order to take up the contours of the vehicle. In many cases it is necessary to apply the film over certain areas and remove it from that area a number of times in order to take up the required position and shape. In some cases it is necessary to apply heat to the film in order to achieve the necessary stretch to match a particularly difficult contour of the vehicle. Thus in effect the film is tailored to the vehicle shape as it is applied making pre-cutting of edges impossible. The whole intention is to apply the film in as large a sheet as possible so that it is in most cases not suitable to cut up the sheet into small pieces for individual application.

The attachment is completed using the skill of the user to properly apply the film without creases and kinks, where necessary pulling the film back from the vehicle surface and the tape to adjust. When attachment is complete, the filament 36 of the first length from the tape is pulled at P1 (FIGS. 5 and 6) so as to cut the film at the first length of tape 30A. The filament 36 of the second length from the tape is pulled so as to cut the film at the second length 30B.

The filament 36 is spaced from the first and second side edges 33, 34 and the tape has a width arranged such that the filament tears through the tape 30 along the length of the tape, when pulled to cut the film, rather than pulling from one side edge 33, 34 of the tape. This is shown in FIGS. 5 and 6 where the filament 36 is pulled out through a tear 30R in the center of the tape 30. This acts to cut the film at the location directly over the tear in the tape as indicated at 18R

The tearing of the tape leaves a portion 30P of the tape along the first side edge underneath the edge of the film. The tearing of the tape leaves a portion 30Q of the tape along the first side edge underneath the portion 18P of the film which is intended to be removed from the cut edge of the film.

The portion 18P of the film and the portion 30Q of the tape are simply removed as they are freely exposed beyond the cut edge 18R. The portion 30P of the tape is removed as indicated at 68 after the film is cut by lifting the edge of the film as indicated at 69 and by carefully pulling the portion away from the cut edge generally parallel to the surface of the vehicle. After the portion 30P is removed, the edge portion of the film at the cut edge 18R is laid flat on the surface of the vehicle. In order to assist in identifying and locating the portion 30P of the tape to ensure that it is all removed, the tape is preferably brightly colored to visually distinguish the portion of the tape from the film.

In some cases to assist in attaching the edge of the film to the surface, a band of primer 70 is applied to the surface at least underneath the tape for increased attachment of the edge of the film to the surface. The adhesive of the tape has the characteristic that the tape can be pulled from the primer 70 on the surface of the object without leaving a residue of the adhesive and without damaging the surface. It will be appreciated that the primer is designed to ensure an increase in adhesive effect with the adhesive 19 of the film and hence the adhesive 35 of the tape must be arranged such that it does not adhere more effectively to the primer in a manner which would prevent simple removal of the tape portions or would lead to adhesive residue being left on the vehicle surface at the primer.

The release coating 31 on the front surface of the tape 30 has a release characteristic relative to the pressure sensitive adhesive 19 on the film such that the pressure sensitive adhesive on the film can be contacted onto the front surface of the tape and pulled away for repositioning.

Figure 12:
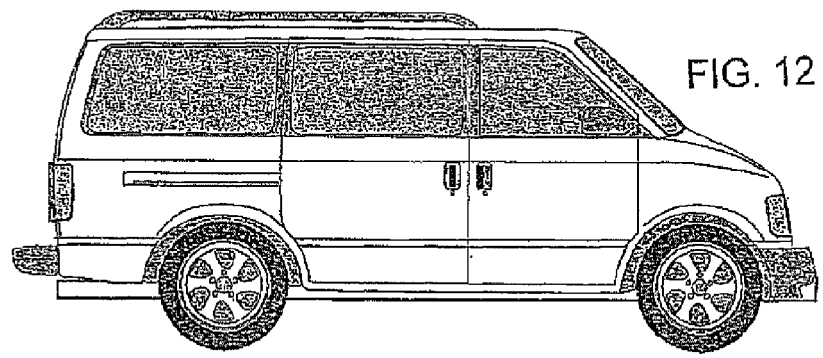
Figure 13:
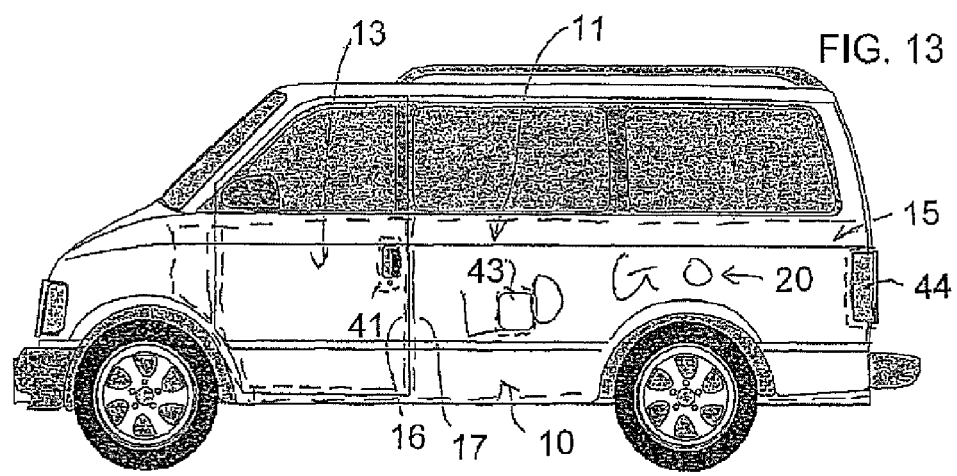

As shown in FIGS. 11 to 13, the vehicle also includes a series of areas which are to be uncovered when the film is applied since the presence of the film would interfere with the operation of the underlying components. This includes door handles 41 and 42, gas filler cap 43 and light housings 44 and number plates 45. In FIGS. 9 and 10, the technique for exposing these elements is shown where a length 51 of the tape 30 is applied to the surface 52 so as to surround the area 53 with one longitudinal side edge of the length of the tape facing inwardly toward the area 53 and with the second longitudinal side edge 33 facing outwardly away from the area with the filament 35 of the length of the tape between those side edges as described hereinbefore and with ends 54 and 55 of the length coming together. Generally the ends are not butted together, but instead, for example where the area 53 is a gas cover, the ends are overlapped so that there is enough filament available to start a cut by pulling on that filament. Alternatively for example where the area 53 is an indented door handle, the ends can cross over into the area 53 and a cut line can be started by cutting with a knife into an indentation of door handle to find one of those ends.

Again the film is applied over the surface 52 including the area 53 so as to wrap the vehicle and apply the pattern to the vehicle with the film being attached to the surface and the vehicle by the adhesive.

Again the filament 36 of the length 51 is pulled at P6 from the tape so as to cut the film around the area 53. The remaining portions of the length 51 of the tape are removed from the surface taking with it the remaining portion of the film 53A over the area. The release coating also facilitates the smooth release the tape portion during this step. The tape substrate has to be of such strength that it does not break during removal. The edge of the film around the area is flattened down onto the surface after the portion of tape underneath the edge is removed.

The release characteristic of the front side of the tape is critical to the application. Not enough release and the wrap film adhesive will stick to the tape and pull the tape off the automobile during repositioning of the wrap film during normal fitting of the wrap film to the automobile.

The release characteristic can be provided by the character of the tape itself in which the base material can be such (Teflon for example) which has low adhesion with the wrap film adhesive. The surface of the base tape film can also be embossed with a pattern that limits the contact area of the film's adhesive thus providing good release. Alternatively a release coating (silicone etc.) can be added to the front surface of the tape to do the same thing. Most tapes are coated on the front surface so that you can pull the tape off the roll. Electrical tape is unsuitable in that it has little or no release coating because it has to stick to itself when wrapped around a wire.

Plastic film based tape works better then paper based tape to produce a clean cut (like a razor) through the wrap film. Paper based tapes produce jagged cuts noticeable to the eye and touch.

The invention claimed is:

1. A tape comprising:
    a tape body of an extensible material having a front surface, a rear surface, a first longitudinal side edge and a second longitudinal side edge;
    the tape body having a first substrate layer overlying and laminated by an adhesive to a second substrate layer so that the front surface of the tape body is defined by the front surface of the first substrate layer the rear surface of the tape body is defined by the rear surface of the second substrate layer;
    the tape body having an adhesive on the rear surface for attachment to an object;
    the front surface of the tape being free from adhesive and having a release characteristic relative to pressure sensitive adhesive such that the pressure sensitive adhesive can be contacted onto the front surface of the tape and pulled away;
    the tape body having a longitudinally extending filament located between the first and second substrate layers;
    wherein the filament is located on the tape body at a position thereon spaced from both side edges of the tape body;
    wherein the filament is arranged at a distance from both side edges which allows bending of the tape while the tape remains flat in a first side to side direction by extension of the tape along the second longitudinal side edge relative to the filament and to the first longitudinal side edge and in a second side to side direction by extension of the tape along the first longitudinal side edge relative to the filament and to the second longitudinal side edge;
    and wherein the filament and the tape body are arranged such that, with the rear surface of the second substrate layer attached to the object, the filament when pulled tears through the first substrate layer of the tape body along the length of the tape body at its position on the tape body spaced from both side edges so as to leave on one side of the position a first portion of the first substrate layer including the first side edge which remains attached to the second substrate layer and so as to leave on an opposite side of the position a second portion of the first substrate layer including the second side edge which remains attached to the second substrate layer, rather than pulling out from one side edge of the tape body.

2. The tape according to claim 1 wherein the adhesive has the characteristic that the tape body can be pulled from a surface of the object without leaving an adhesive residue and without damaging the surface.

3. The tape according to claim 1 or 2 wherein the tape body has a width less than 0.25 inches.

4. The tape according to any one of claims 1 to 3 wherein the filament is less extendible than the tape body.

5. The tape according to any one of claims 1 to 4 wherein the adhesive is arranged to hold the filament in place on the tape body during bending of the tape while the tape is applied to the surface and while the filament is being pulled to tear through the tape body.

6. The tape according to any one of claims 1 to 5 wherein the tape body is colored.

7. The tape according to any one of claims 1 to 6 wherein the tape body carries a single filament.

8. A tape comprising:
a tape body of an extensible material having a front surface, a rear surface, a first longitudinal side edge and a second longitudinal side edge;
the tape body having an adhesive on the rear surface for attachment to an object;
the front surface of the tape being free from adhesive and having a release characteristic relative to pressure sensitive adhesive such that the pressure sensitive adhesive can be contacted onto the front surface of the tape and pulled away;
the tape body having a longitudinally extending filament attached thereto so as to be carried in or on the adhesive on the rear surface;
wherein the filament is attached to the tape body at a position thereon spaced from both side edges of the tape;
wherein the filament is arranged at to a distance from both side edges which allows bending of the tape while the tape remains flat in a first side to side direction by extension of the tape along the second longitudinal side edge relative to the filament and to the first longitudinal side edge and in a second side to side direction by extension of the tape along the first longitudinal side edge relative to the filament and to the second longitudinal side edge;
and wherein the filament and the tape body are arranged such that, with the rear surface attached to the object, the filament when pulled tears through the tape body along the length of the tape body at its position on the tape body spaced from both side edges so as to leave on one side of the position a first portion of the tape body including the first side edge and so as to leave on an opposite side of the position a second portion of the tape body including the second side edge, rather than pulling out from one side edge of the tape body.

9. The tape according to claim 8 wherein the adhesive has the characteristic that the tape body can be pulled from a surface of the object without leaving an adhesive residue and without damaging the surface.

10. The tape according to claim 8 wherein the tape body has a width less than 0.25 inches.

11. The tape according to claim 8 wherein the filament is less extendible than the tape body.

12. The tape according to claim 8 wherein the adhesive is arranged to hold the filament in place on the tape body during bending of the tape while the tape is applied to the surface and while the filament is being pulled to tear through the tape body.

13. The tape according to claim 8 wherein the filament is carried on the adhesive and the filament carries a coating material compatible with the adhesive for generating an improved adhesion between the filament and the adhesive.

14. The tape according to claim 8 wherein the adhesive lies on the tape body over the filament to hold the filament against the rear surface of the tape body.

15. The tape according to claim 8 wherein the tape body consists of a single layer.

16. The tape according to claim 8 wherein the tape body is colored.

17. The tape according to claim 8 wherein the tape body carries a single filament.

* * * * *